Jan. 11, 1927.

T. P. CHASE 1,613,692

VEHICLE BRAKE

Filed Oct. 18, 1923    2 Sheets-Sheet 1

Witnesses

Inventor.

Jan. 11, 1927. 1,613,692
T. P. CHASE
VEHICLE BRAKE
Filed Oct. 18, 1923  2 Sheets-Sheet 2

Witnesses
Inventor.
Theron P. Chase
By Spencer Sewall and Hardman
his Attorneys

Patented Jan. 11, 1927.

1,613,692

UNITED STATES PATENT OFFICE.

THERON P. CHASE, OF DAYTON, OHIO, ASSIGNOR TO GENERAL MOTORS RESEARCH CORPORATION, OF DAYTON, OHIO, A CORPORATION OF DELAWARE.

VEHICLE BRAKE.

Application filed October 18, 1923. Serial No. 669,246.

This invention relates to brake controlling devices for vehicles having brakes on both guiding and driving wheels.

It is among the objects of the present invention to relieve the brake pressure on the guiding wheels of a vehicle when such vehicle is in a turn or more specifically when the said wheels are moved out of straight forward position.

Another object is to regulate the amount of brake pressure on the guiding wheels of a vehicle in accordance with the position of said wheels. That is, with increasing movement of the guiding wheels out of straight forward running position the brake pressure thereon will be proportionately relieved.

A still further object is to adjust the brake operating mechanism by means of the operation of the steering means of the vehicle so that when said means is operated to move the guiding wheels of the vehicle, the brake operating mechanism will be automatically adjusted to apply a predetermined proportion of the entire brake pressure applied to the front wheels in accordance with the position to which the guiding wheels have been moved.

One method of accomplishing these and other objects which appear hereinafter includes the provision of means associated with both the steering apparatus and the brake pressure applying means of a vehicle in such a manner that when the steering means is operated to move the guiding wheels of the vehicle out of straight forward running position, in either direction, the leverage of the connection between the brake pressure applying means and the guiding wheel brake operating rods will be proportionately reduced and at the same time that to the rear wheels increased, in accordance with the amount of movement of the guiding wheels out of straight forward running position. The brake operating mechanism is thereby set to apportion the applied braking energy, between the guiding and driving wheels at a predetermined ratio.

Further objects and advantages of the present invention will be apparent from the following description, reference being had to the accompanying drawings, wherein a preferred form of embodiment of the present invention is clearly shown.

Figure 1:
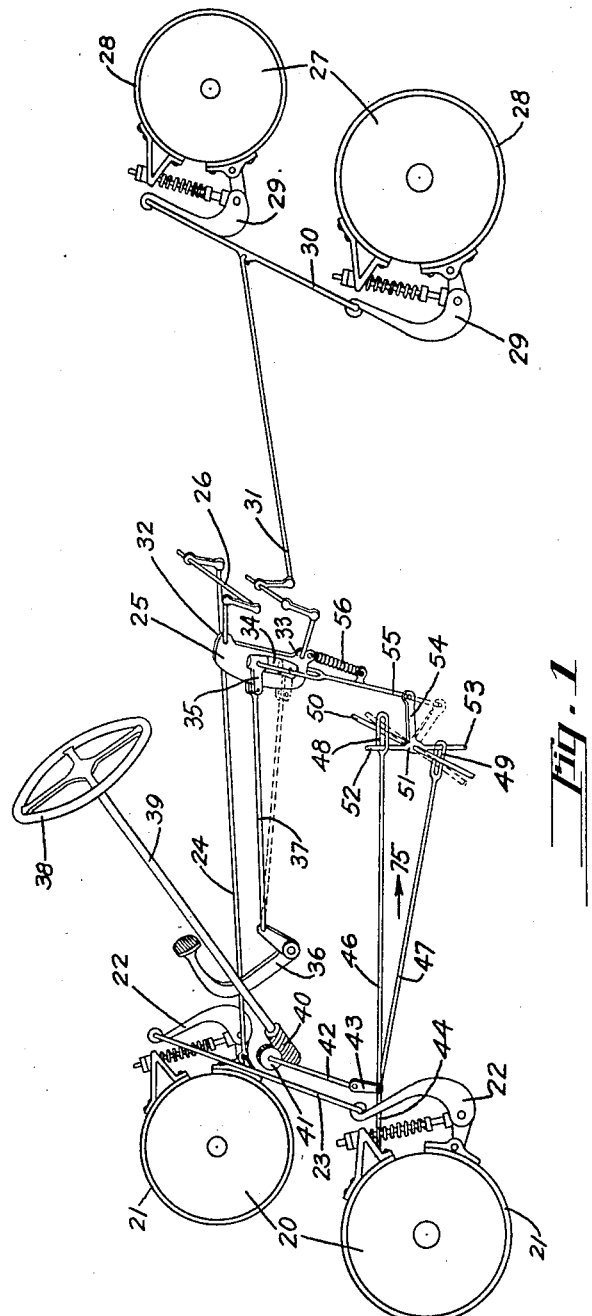
Fig. 1 is a general assembly view of the brake controlling device attached to a four-wheel motor vehicle.

Referring to the drawings, the numerals 20 designate brake drums secured to the guiding wheels 10 of the vehicle. 21 designates the brake bands associated with the brake drums, said brake bands being equipped with the usual brake contracting devices which include levers 22. Connecting the free ends of the similar levers 22 is a cross arm 23, having a rod 24 connected thereto, intermediate the levers 22. This lever 24 is connected with the common operating lever or link 25 by means of levers 26.

27 designates brake drums secured to the driving wheels 11 of the vehicle. These brake drums are provided with brake bands 28, which, like the forward or guiding wheel brakes, have similar operating levers 29, the free ends of which are connected by means of a cross arm 30. This cross arm 30 is connected with the common operating lever or link 25 by means of a suitable lever 31.

The link 25 is provided with ears 32 and 33, the former acting as a connecting point for the guiding wheel brake operating means including levers 24 and 26, while the latter ear 33, forms a connecting point for the driving wheel brake operating lever 31. A radial, longitudinal slot 34 is formed in the link 25. A saddle 35 is slidably fitted in the slot 34, this saddle being connected with the brake pedal 36 by means of the rod 37. Thus, the saddle 35 together with the rod 37 forms a shiftable connecting link between the common lever or link 25 and the brake pedal or energy applying means 36 and acts as the brake energy proportioning means as will be described hereinafter.

38 designates the steering wheel of the vehicle having a column 39 which is provided with a worm 40 adapted to operate the worm gear 41. This worm gear 41 is mounted on a shaft 42 which also carries a vertical arm 43, to which the drag link 44 is connected. The drag link 44 is connected with the steering knuckle of one of the guiding wheels 10 of the vehicle, the other guiding wheel being connected with the drag link by means of tie rod 45. The vertical arm 43 has connected to its free end, in hinged relation, one end of the rod 46 and one end of the rod 47. The opposite ends of these rods are provided with slots 48 and 49 respectively. A cross shaft 50 rotatably supports a T-shaped lever 51, comprising a cross arm and a stem. The cross arm includes oppositely disposed portions 52 and 53, the former projecting into the slotted end 48 of rod 46, while the latter projects into the slotted end 49 of rod 47. As is shown in Fig. 1, these cross arm portions are normally so positioned that the cross arm portion 52 will engage the forward end of the slot 48, while the portion 53 normally engages the rear end of the slot 49. The stem 54 of the T-shaped lever 51 has one end of a rod 55 connected thereto, the other end of the rod is connected to the saddle 35.

When the T-shaped lever 51 is in normal position, as shown in Fig. 1, the rod 55 will maintain the saddle 35 in position in the slot 34, substantially midway between the ears 32 and 33.

A spring 56 is connected to the rod 55 and is adapted to move the rod 55 to return the saddle 35 into normal position as will be described.

Figure 2:
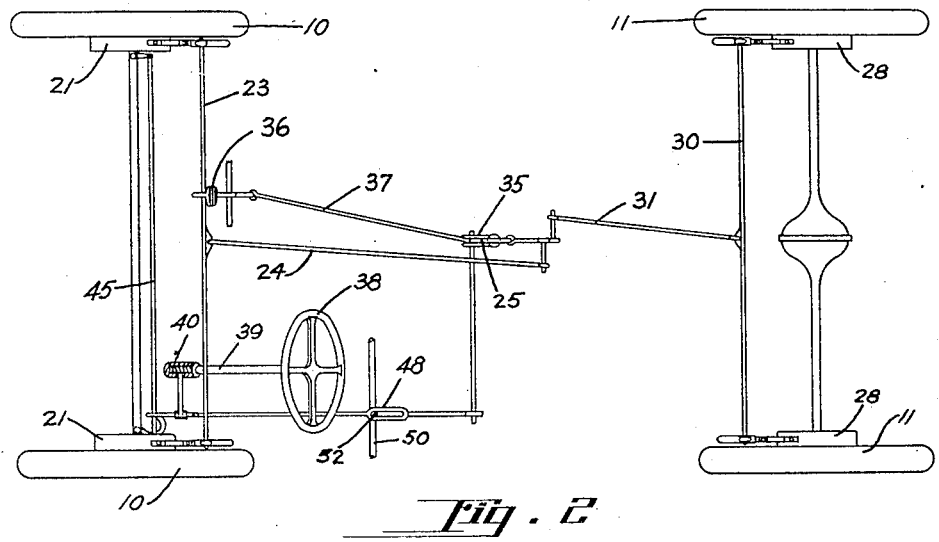
Fig. 2 is a plan view of the device showing the guiding wheels of the vehicle in straight forward running position.

When the guiding wheels 10 of the vehicle are in a position as is shown in Fig. 2, that is, a straight forward running position, the levers associated with the steering means of the vehicle will hold the saddle 35 in position in the slot 34, intermediate the ears 32 and 33. Under these conditions the braking device is so adjusted that, when braking energy is applied on the pedal 36, a pull will be exerted on the rod 37 and saddle 35, to operate the common lever or link 25. The saddle 35 being in this intermediate position on the link, will tend to distribute the energy applied in predetermined proportion between the guiding wheel and driving wheel brake operating levers.

Figure 3:
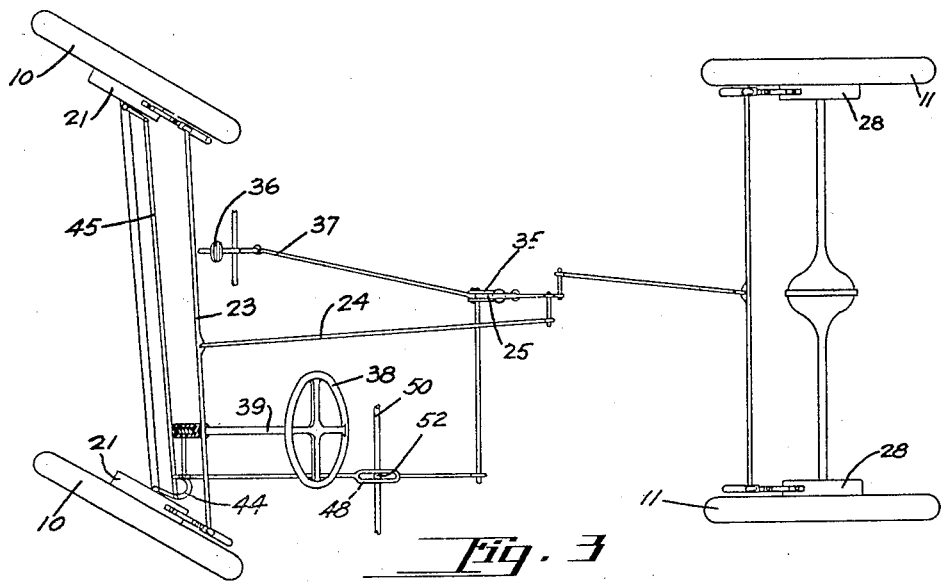
Fig. 3 is a view similar to Fig. 2 showing the guiding wheels of the vehicle moved to the right out of straight forward running position.

Now when the driver operates the steering wheel 38 to deflect the guiding wheels out of staight forward running position in either direction, a shifting of the steering wheels to the right being considered for purposes of illustration as shown in Fig. 3, the arm 43 will be moved in counterclockwise direction, thus tending to push the rods 46 and 47 in the direction of the arrow 75. The rod 46 moving in this direction, will operate the T-shaped lever 51 in a clockwise direction about the shaft on which it is mounted, due to the fact that the cross arm portion 52 of said lever is in engagement with the inner or forward end of the slot 48 formed in the end of the rod 46. However, movement of the rod 47 in the direction of the arrow 75 will not affect the operation of the T-shaped lever 51 because the cross arm portion 53 of the said lever which projects into the slot 49 of the rod 47 is in the outer or extreme rear end of the slot, thus providing a lost motion connection between these two elements, the rod 47 and the arm portion 53, when the rod 47 is moved in this direction. Rotation of the T-shaped lever 51 in this clockwise direction will, through the connection 55, move the saddle 35 from its intermediate position on the common lever or link 25 down toward the end of the said lever to which the rear wheel brake operating rod is connected.

From the aforegoing it will be seen that operation of the steering means will automatically adjust the point of engagement between the saddle 35 and the common lever or link 25. The greater the angle of deflection of the guiding wheels, the greater will be the distance through which the saddle 35 is moved from its intermediate position on said lever 25 toward the point of connection between said lever and the rear wheel brake operating rod. When the vehicle is running in a straight forward direction, the brake operating mechanism will be so adjusted that energy applied through brake pedal 36 will be divided between the guiding and driving wheel brakes in predetermined proportions. However, when the operator manipulates the steering wheel 38 so that the vehicle is directed into a turn, the brake operating mechanism will be adjusted so that the braking energy applied to the brake pedal 36 will be divided between the guiding and driving wheel brakes so that a lesser proportion of the braking pressure will be applied to the guiding wheels in accordance with the amount of deflection of the guiding wheels to make the turn. This re-proportioning of the energy applied, between the guiding and driving wheel brakes is obtained by the shifting of the point of engagement between the saddle 35 and the common lever or link 25 to a position on the link 25 in closer proximity to the point of connection of the driving wheel brake connections to the link than to the guiding wheel brake connections to the link. However, as the saddle aided by the spring 56, approaches the intermediate point on the link between the points of connection of the driving and guiding wheel brake operating rods, the braking energy applied to both these sets of brakes will approach a closer balance.

While the form of embodiment of the present invention as herein disclosed, constitutes a preferred form, it is to be understood that other forms might be adopted, all coming within the scope of the claims which follow.

What is claimed is as follows:—

1. A braking device for a vehicle having brakes associated with the guiding and the driving wheels, comprising in combination, means for operating the brakes; steering means for controlling the position of the guiding wheels; and means actuated by the steering means for adjusting the brake operating means to divide the braking energy applied proportionately between the guiding and driving wheel brakes in accordance with the operation of the steering means.

2. A braking device for a vehicle having brakes associated with the guiding and the driving wheels, comprising in combination, means for operating the brakes; steering means for controlling the position of the guiding wheels; and means associated with both aforementioned means for adjusting the brake operating means to proportion the amount of applied braking energy between the guiding and driving wheels in accordance with the position of the guiding wheels.

3. A braking device for a vehicle having brakes associated with the guiding and the driving wheels, comprising in combination, means for operating the brakes; steering means for controlling the position of the guiding wheels; and means associated with both aforementioned means; for automatically adjusting the brake operating means to transmit to the guiding wheels a predetermined proportion of the entire brake energy applied in accordance with the operation of the steering means.

4. In a braking system for a vehicle including guiding and driving wheels each one of which is provided with a brake device in combination, steering means for controlling the guiding wheels; means for applying braking energy to all of the brakes; and means associated with the steering means for proportioning the braking energy applied, so that the energy exerted on the guiding wheel brakes will be reduced directly and the energy applied to the driving wheel brakes will be increased directly with the amount of deflection of the guiding wheels out of straight forward running position.

5. In a braking system for vehicles including guiding and driving wheels each one of which is provided with a brake, in combination, steering means for controlling the position of the guiding wheels; and means operable by the steering means to divide the energy applied to the brakes in such a manner that the ratio between the energy applied to the guiding wheel brakes and that applied to the driving wheel brakes is directly decreased with the increased movement of the guiding wheels out of straight forward running position.

6. In a vehicle including front or guiding wheels and rear or driving wheels, all provided with separate brakes, a brake controlling device comprising in combination, steering means associated with the front wheels for operating same to guide the vehicle, means for applying braking energy to all of the brakes; and means associated with the steering means for proportioning the applied braking energy between the front wheel brakes and the rear wheel brakes in accordance with the degree to which the front wheels have been moved out of straight forward running position.

7. In a vehicle including guiding and driving wheels each of which is provided with a separate brake, means for transmitting braking energy to all of the brakes steering means associated with the guiding wheels for moving these wheels out of or into straight forward running position in either direction; and means controlled by the position of the steering means to apply substantially equal braking energy on all brakes when the steering means holds the guiding wheels in straight forward running position and adapted to cause proportioning of the energy transmitted so that the guiding wheel brakes will receive a lesser proportion of such transmitted energy as they are moved out of straight forwad running position.

8. In a braking system for vehicles including guiding and driving wheels each one of which is provided with a brake in combination, steering means for controlling the position of the guiding wheels; means for exerting braking energy; means for distributing this braking energy equally between all of the braking devices; and means associated with the steering means for controlling the energy distributing means whereby the energy applied to the guiding wheel brakes will be reduced and that applied to the driving wheel brakes will be proportionately increased with the movement of the guiding wheels out of straight forward running position.

9. In a braking system for vehicles including driving and guiding wheels each of which is provided with a brake in combination, steering means for controlling the position of the guiding wheels; a set of brake operating levers associated with the guiding wheel brakes and a set of levers associated with the driving wheel brakes for operating the same; a link connecting both sets of brake operating levers; means connected with the link for exerting energy thereon; and means associated with the steering means for causing the application of the working energy to the link in such manner that, when the guiding wheels are in straight forward running position, the braking energy will be divided substantially, equal between both guiding and driving wheel brakes, and, when the guiding wheels are moved out of direct forward running position in either direction, the working energy will be re-proportioned to reduce the braking energy exerted on the guiding wheels and to increase the braking energy on the driving wheels directly with the degree to which the guiding wheels have been moved out of straight forward running position.

10. A four-wheel vehicle having a pair of brakes associated with the guiding wheels and a pair of brakes with the driving wheels; a set of levers for operating each pair of brakes; a common lever connected to and adapted to operate both sets of brake levers; a brake pedal for applying braking energy; a shiftable link interposed between the brake pedal and the common lever and adapted to transmit the braking energy applied to the brake pedal equally to both sets of brakes or proportionately therebetween; a steering means for controlling the position of the guiding wheels and means associated with the steering means and connected to the adjustable link between the brake pedal and the common lever whereby when the steering means is operated in either direction to move the guiding wheels out of straight forward position, the shiftable link will be operated to proportionately decrease the braking energy applied to the front wheels and increase the braking energy applied to the driving wheels.

11. A four-wheel vehicle having a pair of brakes associated with the guiding wheels and a pair of brakes with the driving wheels; a set of levers for operating each pair of brakes; a common lever connected to and adapted to operate both sets of brake levers; a brake pedal for applying braking energy; a shiftable link interposed between the brake pedal and the common lever and adapted to transmit the braking energy applied by the brake pedal equally to both sets of brakes or proportionately therebetween; means for controlling the position of the guiding wheels including an arm normally in vertical position; two rods each secured at one end to the arm in hinged relation, and slotted at its opposite end; a T-shaped lever fulcrumed at the point of intersection of the cross arm and stem portion thereof; the one cross arm projecting into and engaging with the front end of the slot of one of said rods and the other cross arm projecting into and engaging with the rear end of the slot of the other rod whereby when the steering means is operated in either direction to move the guiding wheels out of straight forward position, this duo-directional movement of the steering means will be translated into a unidirectional movement to the T-shaped lever; and lever connecting the stem of the T-shaped lever with the shiftable connecting link interposed between the pedal and the common lever for moving said connecting link on the common lever whereby when the wheels are moved out of straight forward running position, braking energy applied by the brake pedal will be proportionately reduced on the guiding wheel brakes and increased on the driving wheel brakes.

12. A braking system for a vehicle including guiding and driving wheels each one of which is provided with a separate braking device, comprising in combination, a set of operating levers for the guiding wheel brakes and a set for the driving wheel brakes; a link one end of which is operatively connected to the guiding wheel brake operating levers and the other end of which is operatively connected to the driving wheel brake operating levers; a brake pedal connected to a saddle secured to but movable longitudinally of the link and normally positioned midway between the connections of the two sets of brake operating levers to the link; steering means for controlling the guiding wheels and including an arm normally in vertical position; a pair of rods each secured at one end to the arm in hinged relation, and slotted at its opposite end; a T-shaped lever fulcrumed at the point of intersection of the cross arm and stem portions, the one cross arm projecting into and engaging with the front end of the slot on one of said pair of rods and the other cross arm projecting into and engaging with the rear end of the slot of the other rod whereby when the steering means is operated to shift the guiding wheels out of straight forward running position in either direction the arm thereupon will rotate the T-lever about its fulcrum, in one direction, a connecting rod between the stem of the T-lever and the saddle for moving the saddle longitudinally of the link; and resilient means for returning the saddle to normal position when the guiding wheels are again shifted to straight forward running position.

In testimony whereof I hereto affix my signature.

THERON P. CHASE.